US008756493B2

(12) United States Patent
Nickas, Jr. et al.

(10) Patent No.: US 8,756,493 B2
(45) Date of Patent: Jun. 17, 2014

(54) SYSTEM AND METHOD FOR GENERATING WEB PAGES

(75) Inventors: George Demosthenes Nickas, Jr., Austin, TX (US); Justin Wiley Johnson, Austin, TX (US); Jennie Marie Mosley, Austin, TX (US); Jacob Andrew Stearns, Bee Cave, TX (US)

(73) Assignee: Neopost Technologies, Bagneux (FR)

( * ) Notice: Subject to any disclaimer, the term of this patent is extended or adjusted under 35 U.S.C. 154(b) by 249 days.

(21) Appl. No.: 12/683,544

(22) Filed: Jan. 7, 2010

(65) Prior Publication Data
US 2011/0167335 A1 Jul. 7, 2011

(51) Int. Cl.
*G06F 15/16* (2006.01)
(52) U.S. Cl.
USPC ............................ 715/240; 715/234; 715/273
(58) Field of Classification Search
USPC ......... 715/200, 234, 235, 236, 240, 243, 255, 715/273
See application file for complete search history.

(56) References Cited

U.S. PATENT DOCUMENTS

| | | | | |
|---|---|---|---|---|
| 7,167,863 B2* | 1/2007 | Ellis et al. | ............................ | 1/1 |
| 7,546,576 B2* | 6/2009 | Egli | ............................ | 717/106 |
| 7,676,762 B2* | 3/2010 | Shafron | ........................ | 715/826 |
| 7,779,451 B2* | 8/2010 | Eldar | ................ | 726/2 |
| 7,895,571 B2* | 2/2011 | Fried et al. | .................... | 717/115 |
| 2003/0084120 A1* | 5/2003 | Egli | ............................ | 709/218 |
| 2004/0034647 A1 | 2/2004 | Paxton et al. | | |
| 2005/0033717 A1* | 2/2005 | Ellis et al. | ........................ | 707/1 |
| 2006/0107217 A1* | 5/2006 | Lu et al. | ........................ | 715/733 |
| 2006/0129937 A1* | 6/2006 | Shafron | ........................ | 715/733 |
| 2006/0294199 A1* | 12/2006 | Bertholf | ........................ | 709/217 |
| 2008/0184199 A1* | 7/2008 | Fried et al. | ........................ | 717/115 |
| 2009/0024982 A1 | 1/2009 | Diep et al. | | |
| 2010/0057830 A1 | 3/2010 | Takala | | |

OTHER PUBLICATIONS

J. Mogul, "The Case for Persistent-Connection HTTP", Digital Equipment Corporation Western Research Laboratory, pp. 1-16.
V. Padmanabhan et al., "Using Predictive Prefetching to Improve World Wide Web Latency", pp. 1-15.
"Speed Up Your Site: Reduce the HTTP Requests", http://www.dailyblogtips.com/speed-up-your-site-reduce-the-http-requests/, pp. 1-7.
Xuan Chen et al., "Preferential Treatment for Short Flows to Reduce Web Latency" pp. 1-15, ISI-TR-2001-548, Oct. 2001.
V. Padmanabhan et al. "Improving HTTP Latency" pp. 1-13.
Tong Sau Loon et al., "Alleviating the Latency and Bandwidth Problems in WWW Browsing", Proceedings of the USENIX Symposium on Internet Technologies and Systems, Monterey, California, Dec. 1997, pp. 1-13.

(Continued)

*Primary Examiner* — Stephen Hong
*Assistant Examiner* — Gregory J Vaughn
(74) *Attorney, Agent, or Firm* — Morris & Kamlay LLP

(57) ABSTRACT

Systems and methods for creating Web pages are provided. Web page development components, referred to as "pods," may be used to encapsulate discrete functionality for use and re-use within Web pages. The pods may be contained in a library, from which a developer may select one or more pods that provide the functionality and/or presentation definitions the developer wishes to include in the Web page. A pod may contain all the functional and presentation information required to implement the desired functionality, and may contain only that functional and presentation information.

15 Claims, 7 Drawing Sheets

(56) References Cited

OTHER PUBLICATIONS

C. Wills et al., "N for the Price of 1: Bundling Web Objects for More Efficient Content Delivery", USENIX, *WWW10*, May 15, 2001 Hong Kong, pp. 1-8.

Fox et al., "Reducing WWW Latency and Bandwidth Requirements by Real-Time Distillation", pp. 1-12.

Nokhani et al., "A Novel Approach to Reduce Latency on the Internet: Component-Based Download", pp. 1-6.

bennadel.com,"Compiling Several Linked Files Into One File", pp. 1-10, http://web.archive.org/web/20080521013401/http://www .bennadel.com/blog/1192-Compiling-Several-Linked-Files-Into-One-File.htm, Apr. 8, 2008.

Laura Lemay's web workshop,"Microsoft FrontPage 98", Sams.net Publishing, pp. 1-71, Nov. 1997.

tizag.com,"HTML tutorial", pp. 1-13, http://www.tizag.com/htmlT/index.php, Dec. 18, 2008.

Yahoo! Developer Network,"Best Practices for Speeding Up your Web Site", pp. 1-8, http://developer.yahoo.net/blog/archives/2007/04/rule1__make__few.html, Oct. 11, 2007.

\* cited by examiner

SYSTEM AND METHOD FOR GENERATING WEB PAGES

CROSS REFERENCE TO RELATED APPLICATIONS

The present application is related to U.S. patent application Ser. No. 12/683,543, filed concurrently herewith, the contents of which are incorporated by reference herein in their entirety.

BACKGROUND OF THE INVENTION

Modern Web pages can provide a range of content and functionality, from plain text and images to interactive, full-featured applications. To do so, Web pages include multiple scripting, style definition, markup, and other components, such as JavaScript (JS), Cascading Style Sheet (CSS) definitions, HTML, images, and other components. These components generally may be grouped into functional components (e.g., scripts), presentation definitions and data (e.g., CSS, images, and HTML), and substantive content (e.g., HTML and text that embodies the subject matter of a Web page). Web page construction is based on a print media paradigm, with primary attention paid to presentation structure with a presentation-based emphasis on management of and response to user input. Data typically is static or managed entirely on a server. For example, Web pages are commonly constructed with code of each type of component grouped together and served out of context with the functionality to which they refer, such as CSS definitions and scripting portions of a Web page grouped at the top of the physical page loaded by an end user's Web browser. Because of this, individual functional components are split into constituent components among different lists of components or sections of the Web page, which are not easily discernable among the groups. While this reduces file accesses to the server, it prevents functional components from being readily reused for different pages within the same site, and increases the difficulty of isolating specific functions performed by a particular functional component.

BRIEF SUMMARY OF THE INVENTION

In an embodiment, a method of constructing a Web page may include presenting a plurality of Web page development components to a developer, each Web page development component including only the scripting and presentation elements necessary to implement a distinct functional component of a production Web page; receiving a selection of one of the plurality of Web page development components, where the selected Web page development component is configured to provide a notification to a Web page including the distinct functional component when the distinct functional component causes a data change; and, responsive to the selection, constructing a production Web page that includes the distinct functional component associated with the selected Web page development component, where the production Web page is configured to notify a second distinct functional component upon receiving the notification from the distinct functional component associated with the selected Web page development component.

In an embodiment, a method of constructing a Web page may include presenting a plurality of Web page development components to a developer, where each Web page development component includes the Web page elements necessary to implement a distinct functional component of a production Web page; receiving a selection of one of the plurality of Web page development components, and, responsive to the selection, constructing a production Web page that includes the distinct functional component associated with the selected Web page development component.

In an embodiment, a method of creating a production Web page including a functional component may include creating a Web page development component that defines each function and each presentation element required to implement the functional component in a Web page; storing the Web page development component in a development library; receiving a selection of the Web page development component from a developer of the production Web page; responsive to the selection, incorporating the Web page development component in the production Web page; and responsive to a request from an end user, providing the production Web page to the end user.

DETAILED DESCRIPTION OF THE INVENTION

Figure 1:
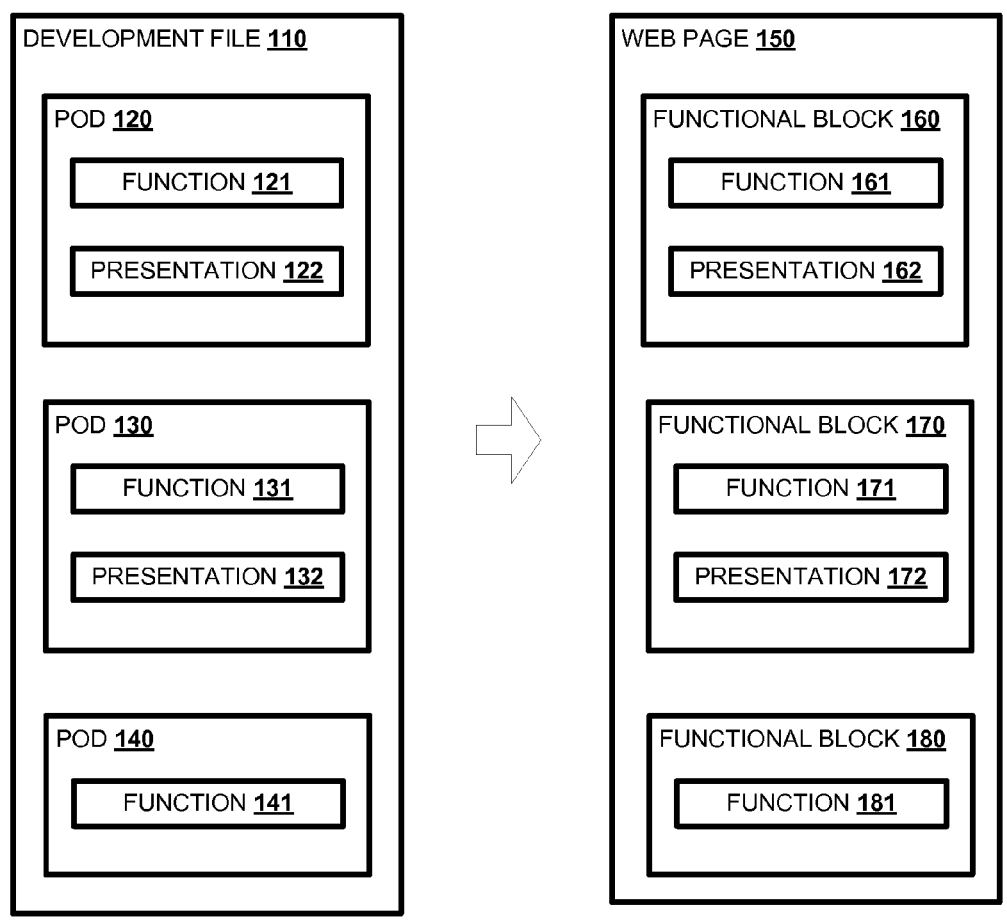
FIG. 1 shows an example of a Web page developed using Web page development components according to an embodiment of the invention.

As used herein, and as understood by one of skill in the art, when a first file is described as "including" a second file, the contents of the second file may be duplicated in the first file, or a link to the second file may be included in the first file. As a specific example, an HTML file may "include" a JavaScript file by way of an appropriate tag, typically an HTML "script" tag. Generally, a file referenced by another file by way of a link will be downloaded by an end user Web browser by way of a separate request to the Web server. In contrast, if the contents of the second file are duplicated in the first, no subsequent request is necessary to obtain the contents of the second file. As used herein, when a second file is "included in" a first file, the second file may be referenced by the first file, or the contents of the second file may be duplicated within the first file. As used herein, when a first file "links to" or "includes a link to" a second file, the contents of the second file are not copied or otherwise directly included in the first file. Rather, a "linked" file remains a separate file that is referenced via an appropriate tag or link, such as the HTML script tag described above.

Embodiments of the invention provide methods and systems to create and use functional and/or presentation items, referred to herein as "pods," each of which encapsulates source code of the various components used to provide a portion of the presentation and/or functionality of a Web page. In general, a "pod" is a component that may be used during development of a Web page. A pod defines and provides all the required functionality or presentation information to implement a discrete or distinct element of functionality or presentation on a Web page. Pods may be reused within different Web pages, such as separate pages within a Web site. Each pod may be defined within a single source file, and may include or link to other component files and/or other pods. In instances in which a first pod links to other pods, the other pods may be referred to herein as "sub-pods" of the first pod. Any given pod need not consider a specific Web page in which it may eventually be included as the context of any pod may be handled automatically by generalized pod infrastructure code, allowing an enhanced use (and reuse) of pods in any given Web page.

In an embodiment, a pod may contain all the functionality, presentation definitions, and images, necessary to generate a functionally-distinct portion, or block of a Web page, and may include nothing other than that functional and presentation data. Specifically, each pod may exclude functional or presentation data not required to generate or implement the presentation or functional block defined by the pod, and may exclude substantive material, such as Web page content. One way of defining a functionally-distinct block is in terms of the relationship of the block to other functional blocks that may be included in the same Web page. For example, a functional component or block may be defined as distinct if it does not include constituent source code related to the functionality or presentation of other components that appear in or are used by a Web page. Thus, each pod may not have any constituent source code related to the functionality or presentation of other pods. In some embodiments, a sub-pod may be dependent upon the pod to which it is linked, but exclude dependencies on other pods in a Web page. Thus, the constituent source code of each pod may be encapsulated and reusable in multiple Web pages that require the same functionality or presentation.

A Web page in which pods are used may define relationships and act as a "traffic manager" to manage data flow between the page as a whole and each pod used therein, as well as among any pods used in the page. Pods may use a generic method of fetching and collating application data received from the server for user display. A scripting convention allows pods to collect and dispatch data-bearing user and scripting events to the Web page, which then notifies other pods that use the particular data. The use of pods and their accompanying data flow management techniques allows integration of client-side, user event driven scripting to provide a Web page structure that mirrors server-side source data structure and methods. The result is a Web page that is both a view into the data and a responsive machine that enables task completion for the user.

FIG. 1 shows an example of a Web page 150 developed using pods according to an embodiment of the invention. A development Web page file 110 may be created by a developer of the Web page 150, and serve as a development library of available pods for use. The development Web page file 110 may include one or more pods 120, 130, each of which contains all the page components necessary to perform and present the functionality defined by the pod. For example, a first pod 120 may include one or more functions 121, such as JavaScript or other script components, and presentation data 122, such as CSS definitions, images, image links, or other presentation definitions and data, used to perform the particular function 121 and present the associated functionality to a user of the Web page 150. Similarly, a second pod 130 may include functions 131 and presentation data 132 for a second function or functionality. Each pod 120, 130 may be functionally independent of the other, i.e., the functionality provided by the first pod 120 may not depend on or relate to the functionality provided by the second pod 130, and/or functionality provided by the second pod 130 may not depend on or relate to functionality provided by the first pod 120. As previously described, each pod may reference or include one or more other pods ("sub-pods"), which may provide a subset of the functionality provided by the referencing, or "parent" pod. The development Web page file 110 also may include pods that provide only presentation definitions or only functions, such as, for example, pod 140 which only provides function definitions 141. For example, a pod 140 may provide functionality that is not directly associated with any user-visible features of the Web page 150, such as a database interface that provides data to other pods, a mathematical function or library, or any other function 141 defined within pod 140. In an embodiment, a development library of pods available for use may be provided, such as by a database or other system.

After the development Web page file 110 is created, it may be used to generate a Web page 150 suitable for delivery to an end user. The Web page 150 may be referred to as a "production" Web page. In an embodiment, the Web page 150 may include pods that are functional blocks or other identifiable components that directly correspond to the pods 120, 130, 140 used in the development Web page file 110. For example, functional blocks 160, 170, 180 may correspond to pods 120, 130, 140, respectively. In an embodiment, each functional block may be a copy of the corresponding pod. In other embodiments, the pods may be interpreted or pre-processed to generate the functional blocks, such as to obfuscate and/or optimize material sent to the end users. Each functional block may include the functional and presentation data defined by the corresponding pod. For example, functions 161, 171, 181 may correspond to or duplicate functions 121, 131, 141, respectively, and presentation data 162, 172 may correspond to or duplicate presentation data 122, 132, respectively, as defined in the pods.

Pods may be reusable within multiple development files 110 and/or production Web pages 150. For example, a pod may provide standardized functionality and/or presentation information for a common function. As specific, non-limiting examples, a pod may be used to provide a user log-in, a time/date display, an account balance, and an interface to enter an address block. Sub-pods may be used as appropriate. For example, a pod that provides an interface to receive address information from a user may include sub-pods for different address block components such as addressee name and zip code. Any other distinct Web page function or component may be provided in a sub-pod.

When the Web page 150 is accessed by an end user, the pods may display data and perform various functions as defined. In some embodiments, the Web page 150 may be considered as managing data transfers and relationships between the page 150 and the pods contained in the page. For example, in an embodiment, a Web server (not shown in FIG. 1) may provide information to the Web page 150 after it has been delivered to an end user, such as where database request results are sent from the Web server to the Web page 150. The Web page 150 may then distribute the data to the appropriate pod or pods on the page. For example, information may be requested by a particular pod. The requested information may be obtained from a database by the Web page 150 by sending an appropriate request to a Web server and receiving a response that includes the requested information. In some embodiments, a pod may directly communicate bi-directionally with the server to exchange data as necessary. For example, a pod may need to fetch data, or perform some specific action. This can be based upon user input within the pod, or responsive to an event to which the pod is related. If the data is "owned" by the pod, the pod will request it, update it, or add it, as appropriate. For example, the pod may directly request data from the Web server (or other appropriate database or filesystem). Further, the pod may provide the data to the Web page 150 so that other pods may utilize such data.

In some embodiments, the Web page 150 also may manage or interact with conditions or data between the pods contained in the Web page 150. Data events between pods to be managed by the Web page 150 may include "fire", "subscribe", and "process" events. A pod may "fire", or transmit a data event to the Web page 150 when the pod identifies a new condition or data about which the page or other pods should be informed. As a specific example, a pod associated with a parcel shipping Web page may indicate that it is showing available parcel pickup options, or requires specific data to be input from an end user by "firing" to the Web page. A pod may "subscribe" to, or request to be informed by the Web page 150 of, certain information or events, (e.g., certain fired data events). As a specific example, a pod associated with the parcel shipping webpage may need to be notified when the pod should require an end user to provide certain information, such as a phone number in response to the user's request to deliver a parcel to a residential address. As another example, a first pod may request data for and display a list of shipping carriers and shipping products that a user can select to ship a package. A second pod may provide an interface for the user to enter a destination address. A list of available countries in the second pod may depend on the combination of carrier and product selected in the first pod. For example, a "Next Day Morning" option may be available only for domestic shipments. Changing the carrier/product combination in the first pod will fire the data change to the Web page, which will then inform any subscribers of the change. In the example, the second pod may be subscribed to this information and, upon receiving notification of the changed data, the second pod may request the list of countries available for the selected carrier/product combination. In this example and other embodiments, neither pod is required to make assumptions about which other pods may require access to data contained in the pod. In some embodiments, fired and subscribed data events may be held in a temporary queue until the Web page 150 initiates the process event to dispatch the fired events to all pods that have subscribed to the data contained in or related to the fired events. Because data relationships between pods are managed by the Web page 150, reuse of pods within multiple Web pages 150 can be accommodated by developing each Web page 150 to manage the necessary fire and subscribe events associated with the pods included therein.

Another illustrative example may include a Web page having a carrier pod and an address pod. The carrier pod can request data for, and display, a list of carriers and corresponding shipping services from which a user can choose to ship a package. The address pod may allow submission of a destination address. The address pod may provide a list of available countries that may be dependent upon on the carrier and/or product selected via the carrier pod (e.g. Next Day Morning shipping is only available for domestic shipments). Therefore, a change in either the carrier or service via the carrier pod will fire that data change to the enclosing Web page. The Web page will then inform the subscriber(s) (such as the address pod) of that data change, such that that address pod may request the list of supported countries for the given carrier/product from the server. An advantage of the pod arrangement is that neither pod has to include information (or make assumptions about) other pods that may need access to data contained in that pod.

Figure 2:
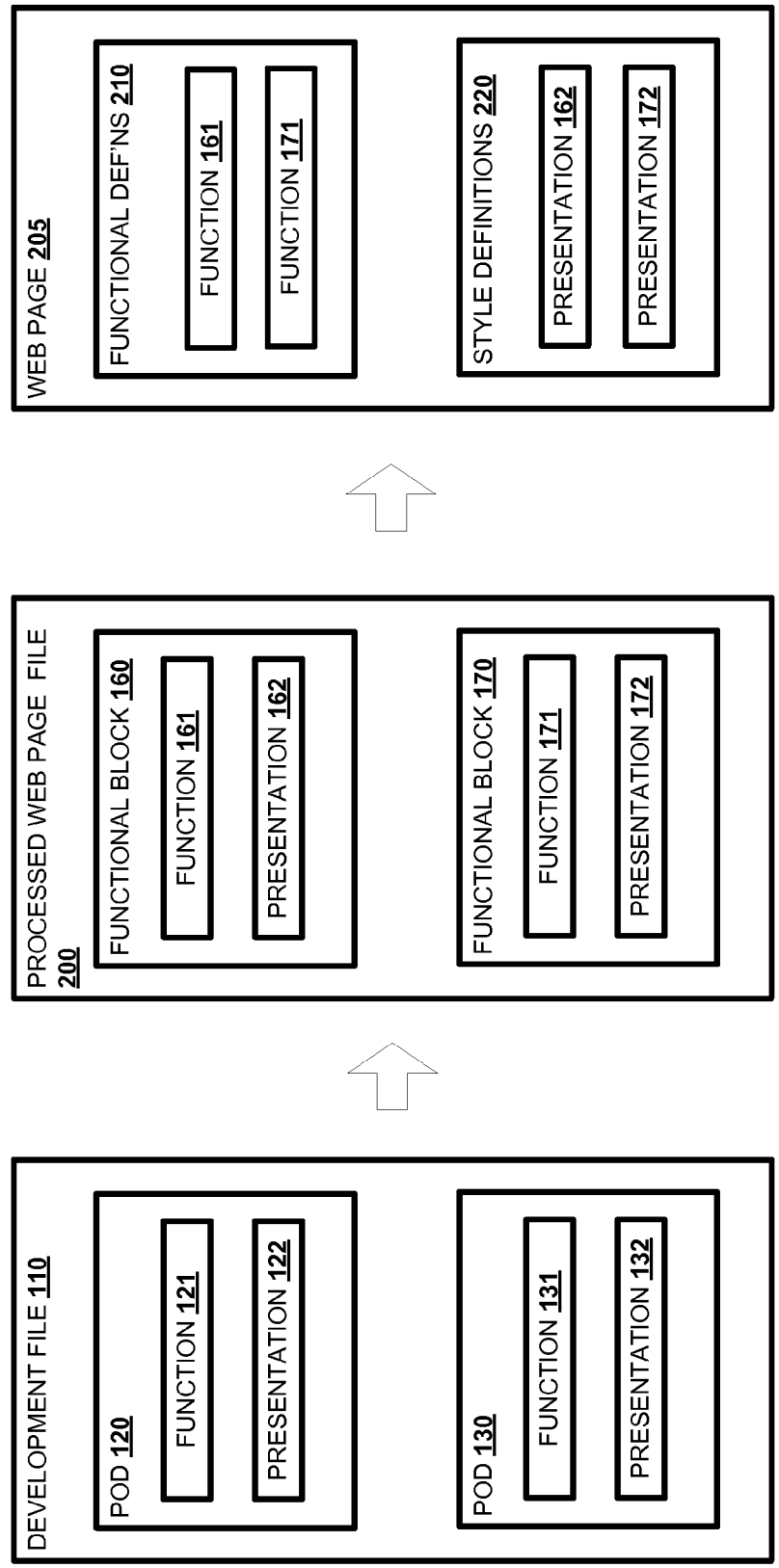
FIG. 2 shows an example intermediate processed Web page file and an associated production Web page according to an embodiment of the invention.

In an embodiment, the production Web page 150 may not be directly created from the development file 110. For example, a Web server or other intervening server may process the development file 110 to generate an intermediate file, or to generate the production Web page in a different form. FIG. 2 shows an example intermediate processed Web page file 200 and resulting production Web page 205 according to an embodiment of the invention. As previously described, a development file 110 or a filesystem may include, as development libraries, one or more pods 120, 130. A processed Web page file 200 may be generated from the development file 110. The process file 200 may mirror the development file 110 and/or the expected production Web page 205 in the arrangement of functional blocks and/or other components. For example, the process file 200 may have a structure similar to that previously described for the production Web page 150 with respect to FIG. 1, in which functional blocks correspond to pods used to create the development file 110. In an embodiment, the process file 200 may then be used to generate the production Web page 205. However, in some embodiments the production Web page 205 may have a different logical structure than previously described, as depicted in FIG. 2. For example, the production Web page 205 may have a structure designed to optimize transmission between a Web server and an end user, at the cost of a lower readability. As a specific example, the production Web page 205 may be generated to have separate functional or style definition portions 210, 220, respectively, which group together components of like type. In an embodiment, the development file 110 may be parsed and the Web page 205 generated directly, without using an intermediate process file 200. The different groups of like-type components 210, 220 may be generated automatically, and may be stored in multiple, separate files. A specific example of a process and system to generate a production Web page 150 as shown in FIG. 2 is described in co-pending U.S. Application Ser. No. 12/684,543, "System and Method for Generating Web Pages," filed Jan. 7, 2010, the disclosure of which is incorporated by reference in its entirety.

Figure 3:
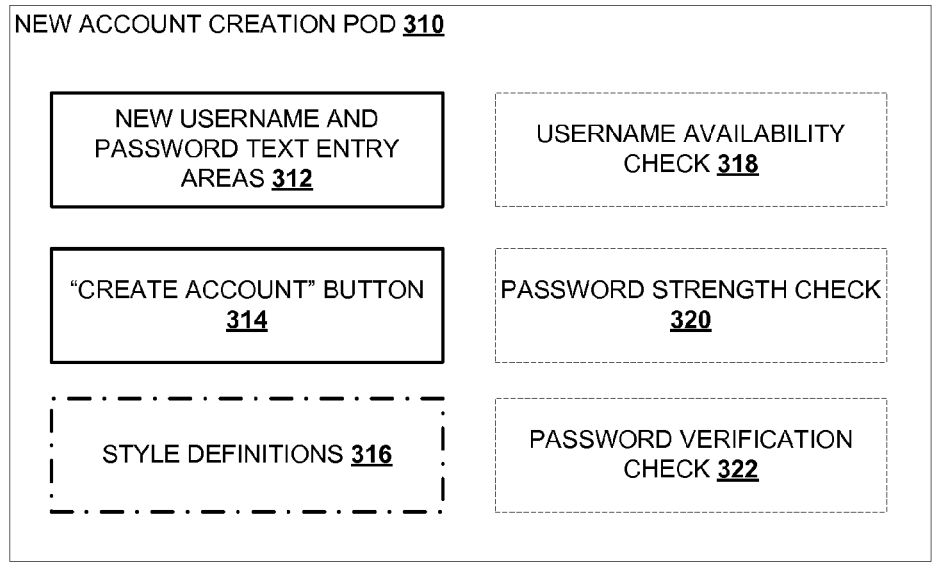
FIG. 3 shows an example of a Web page development component and an associated portion of a Web page generated and controlled by the component according to an embodiment of the invention.

FIG. 3 shows an example of a pod 310 and an associated portion of a Web page 350 that uses the pod 310. The example is for a portion of a Web page that allows an end user to make a new account with a Web site, but it will be understood that the principles and concepts may be readily extended to other specific functions and Web pages. The example pod 310 includes data defining end user-visible elements 312, 314 for displaying username and password text entry areas and a "Create Account" button, respectively. The data may include, for example, images to generate the button, background images for the text entry boxes, and HTML to define each element within the Web page component 350. The pod also includes style definitions 316 for the pod 310, such as definitions of the text color, size, and font, the text input area borders, the width of the component 350, the appearance of the "password strength" indicator, and other style information. The style information may complement or override other style information for a Web page that includes the component 350.

The example pod 310 also may include functions 318, 320, 322 to implement functionality associated with the component 350. For example, a username availability check 318 may check the status of a potential username entered by an end user and determine whether the username is available for registration as a new account. Other functions may include a password strength check 320 to indicate the relative security of a password chosen by the end user, and a password verification function 322 to verify that the end user correctly re-types a selected password. The various elements in the pod 310 may interact with one another. For example, the password strength indicator may be displayed differently depending on the relative strength of the password as determined by the password strength check function 320. In an embodiment, the example pod 310 may include sub-pods that provide this interaction via the Web page and an event firing and subscription mechanism as previously described.

Pods may be constructed and developed as objects in an object-oriented programming system or language. Specific pseudo-code examples of classes, methods, and objects for constructing pods in such a system are provided below. It will be understood that the particular entities provided are intended to be illustrative only, and other structures and techniques may be used without departing from the scope of the invention.

PageController Class Methods:
  PageController.addPodListener (Pod, <data_event_type>)
    adds this Pod instance to the list of pods set to receive ("listen for") data events dispatched by PageController of <data_event_type> when fired by other Pods
  PageController.removePodListener (Pod, <data_event_type>)
    removes this Pod instance from the list of Pod listeners for <data_event_type> type events
  PageController.dispatch (<data_event_type>)
    when receiving a fire event from a Pod, sends data event of <data_event_type> to all the Pods listening for events of <data_event_type> type.

Pod Class Methods:
  Pod.register( )
    informs Web page (PageController) that a particular Pod instance has been loaded on the page
    specific actions can be triggered when a pod is registered, like initialization
  Pod.initialize( )
    performs tasks on the Pod related to its initial loading by the page
  Pod.subscribe (<data_event_type>)
    runs PageController.addPodListener and performs other actions related to beginning to listen for <data_event_type> type events for this Pod
  Pod.unsubscribe (<data_event_type>)
    runs PageController.removePodListener and performs other actions related to ending listening for <data_event_type> type events for this Pod
  Pod.fire (<data_event_type>)
    runs PageController.dispatch (<data_event_type>) to bubble up data event, and performs other actions related to ending to firing a data event for this <data_event_type> type.

Example Pod Object:
  AddressPod=new Pod( )
  AddressPod.register( ) triggers AddressPod.initialize
    populates a list of available countries based on the server data received by PageController
  AddressPod.subscribe ('carrier_code')
    since we decide certain data related to the country chosen by the user based on the carrier chosen (in another Pod, perhaps CarrierServicePod), we want AddressPod to listen for changes in the selected carrier_code.
  AddressPod.fire ('zip_code')
    since the zip_code entered by the user influences what routing is available for the package, we want to inform other pods (e.g. the ParcelsPod whose package parameters are influenced by the result of the routing check) of the change in the entered zip_code.

The use of pods as described herein may allow for extension of well-understood programming techniques and systems, such as object-oriented systems, to development of Web pages. This may be useful because, in general, developing Web pages may be a much less structured task than the creation of relatively pure object-oriented systems. Further, object-oriented methods often are used to develop the server- and client-side code that interfaces with the production Web page delivered to end users. The use of pods also may allow a developer to address the inclusion of different media types in the Web page, while still using object-oriented methods (e.g. subclassing, inheritance, etc.) to create different but programmatically well-defined Web pages.

The use of methods and systems as described herein also may allow a developer to organize the different components used to build a Web page into functional blocks that combine different Web technology implementations, for example HTML, JavaScript, and other component types. Pods also allow developers to implement functionally different portions of page content into encapsulated, reusable components. By consulting a library of such components, developers may then use the specific pods necessary or desirable to build a page without having to consider each section's dependencies, since they are included within each pod. For example, as previously described, a developer mat define a display block to be used on a login page, which includes display elements (e.g., HTML to show a username and password field, and a button to trigger the server-validated login action), JavaScript to validate user input and execute the necessary user events, and Cascading Style Sheets to create the appropriate layout and branding for the pod.

In an embodiment, each pod may contain not only the display HTML to render a content block or other component in question, but also all scripting, styles, and images necessary to create dynamic HTML (DHTML) appearance and functionality specified for the pod. Thus, the use of pods as described herein also may provide insight into the functionality of a particular Web-based application, because the developer is able to see the types of Web pages that pre-defined components may be used to create. This method may allow for Web page "subclassing," since developers need only know the inputs and outputs for a pod to use it in an implementation. These techniques may be contrasted to a monolithic, less encapsulated method where the functionality of the entire page is largely inseparable, and the developer must spend additional time understanding the entire page to reuse a single portion of it.

In an embodiment, pods may allow for client-side files to be set in a server-side data structure so that they can be aggregated and built with a tool such as the Page Resource Builder described in U.S. Application Ser. No. 12/684,543, filed Jan. 7, 2010, rather than including the same content and definitions inline within the page HTML. Pods may use a generic method of fetching and collating application data received from the server for user display. To allow inter-pod communication and interaction, a scripting convention may be used which allows the various pods to collect and dispatch data-bearing user and scripting events to a container, such as the Web page, which then notifies each of the other pods in the Web page that use the particular data about said events and data changes.

For illustration purposes, the table below provides a comparison of an embodiment of the invention and a "standard" Web page, i.e., a Web page that uses known HTML, presentation, and script techniques. It will be understood that the comparison is provided as an example only, and various embodiments may have other differences or similarities to other Web page development techniques and implementations.

| | "Standard" Web Page | Pod model |
|---|---|---|
| Hierarchy | Only provided as an aspect of Web page presentation, i.e. extended functionality is not inherent | Pods (functional/presentational items) may be arranged in strict hierarchical model of parents and interchangeable children that allow for integrated functionality among conceptual/functional units |
| Data | There is no data handling inherent in Web page technology other than that manually created by un-encapsulated, custom scripting | Data management may be inherent in the pod model, and pods may provide methods and tools to transact data between parents and children, the Web page, and the server |
| Code | Client code is primarily geared toward driving presentation, i.e. there are no functional objects | Client and server code may integrate to provide concurrence between server objects (e.g., database objects) and Web page objects (Pods) |
| Development | Without specific plug-in objects to draw from, Web pages often are developed in an undifferentiated, monolithic manner based on content type (e.g., the appearance is defined first, followed by dynamic functionality, and finally, data is infused into the resulting "shell" page). | Web pages may be assembled by selecting from a toolkit of pods (function/data/presentation objects) appropriate to the display and functional requirements of the Web page. The objects may be reusable across Web pages and sites, allowing planning and allocation to be more granulized. |

Figure 4:
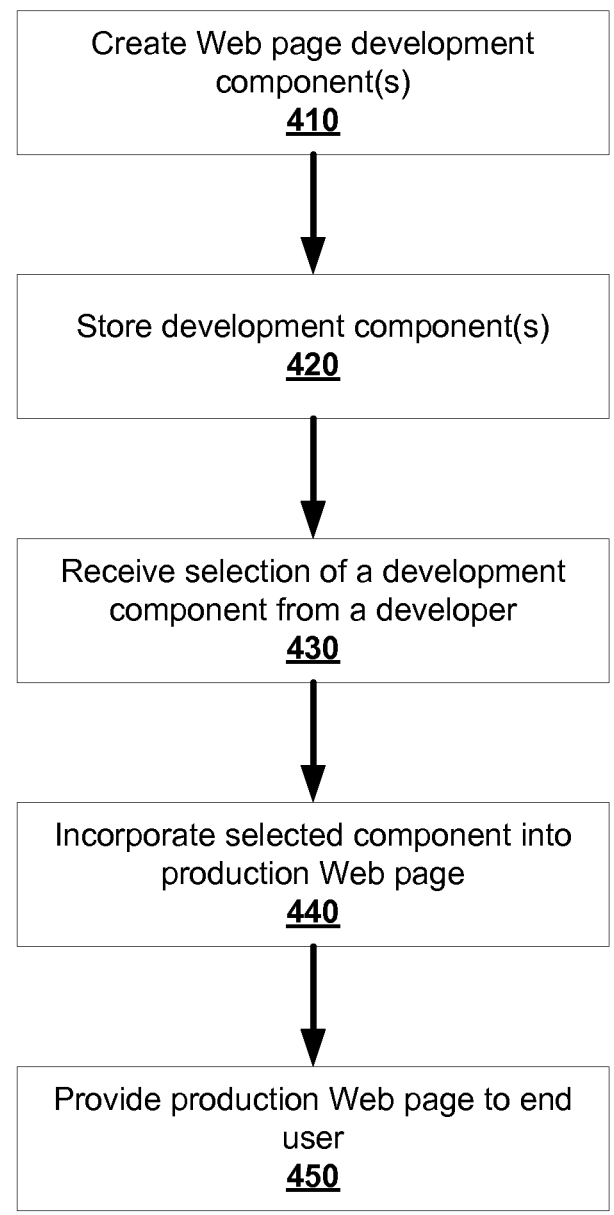
FIG. 4 shows an example process for implementing a production Web page using a pod selected from a pod library according to an embodiment of the invention.

In an embodiment, a partially- or wholly-automated or computer-implemented process may be used to generate and/or implement one or more pods in a production Web page. FIG. 4 shows an example process for implementing a production Web page using a pod selected from a pod library. It will be understood that some or all of the example process may be repeated to add additional pods or sub-pods to the Web page. At 410, one or more Web page development components may be created. Each component may define the function and/or presentation elements required to implement a functional component of a Web page. A component may be created, for example, by generating the required scripting, presentation, and other elements required to implement the functional component, and placing the elements in a container, such as a text file or a portion of a text file. At 420, the development component may be stored, such as in a development library. At 430, a developer of a production Web page may select a development component from the library. At 440, the selected component may be incorporated into a production Web page, such as by implementing the associated functional component in the Web page. At 450, the production Web page may be provided to an end user.

Figure 5:
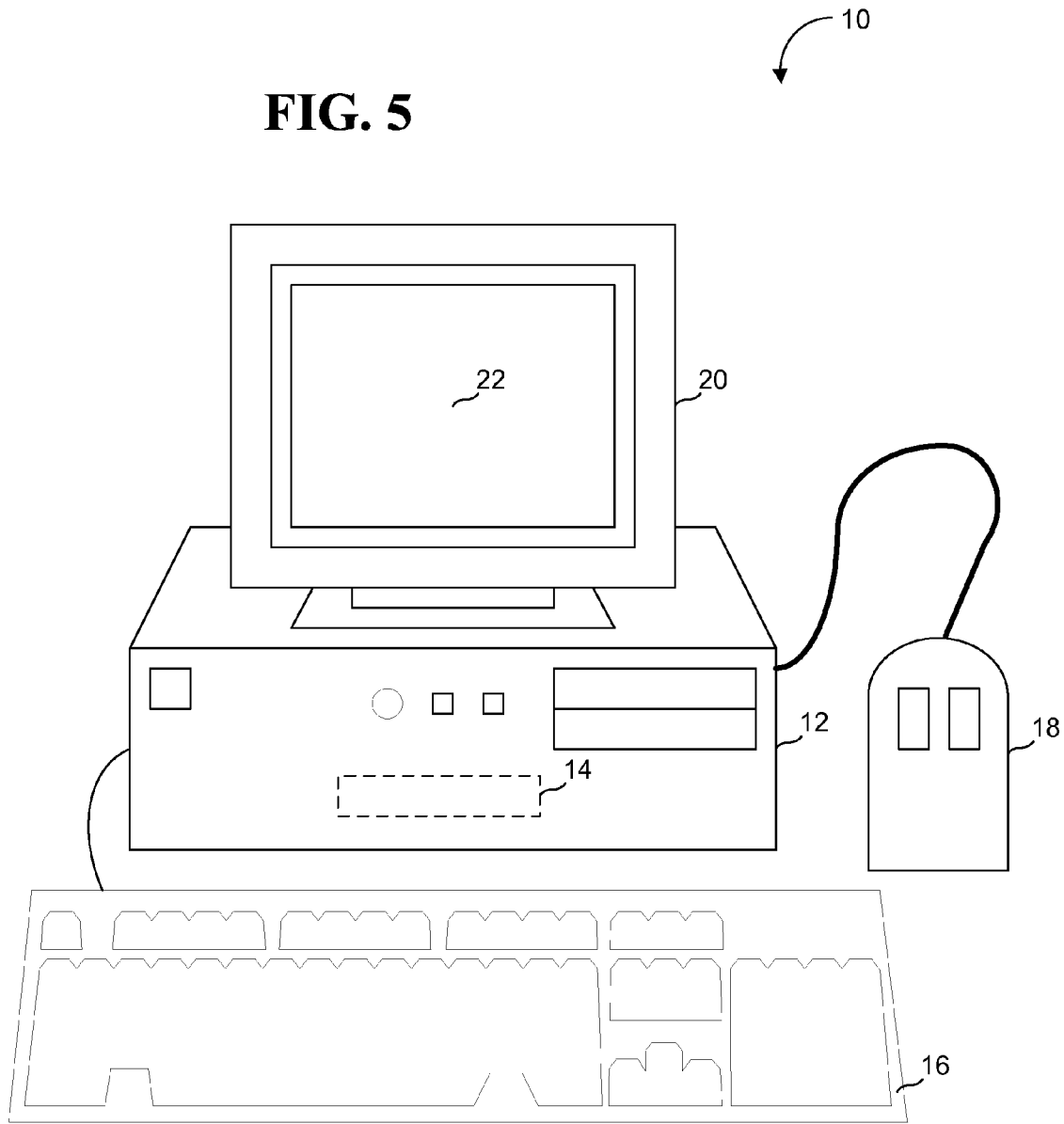
FIG. 5 shows a computer suitable for use with embodiments of the present invention.

FIG. 5 shows a computer suitable for use with embodiments of the present invention. The computer 10 may include a processing unit 12, which may include one or more computer readable storage media 14. The computer may interface with a human operator via an output 20, which may include a visual display 22 to display text, graphics, video, and other visual data. The computer may receive input via a mouse 18, keyboard 16, and/or any other suitable user interface. The general operation of the computer 10 will be understood to one of skill in the art.

Figure 6:
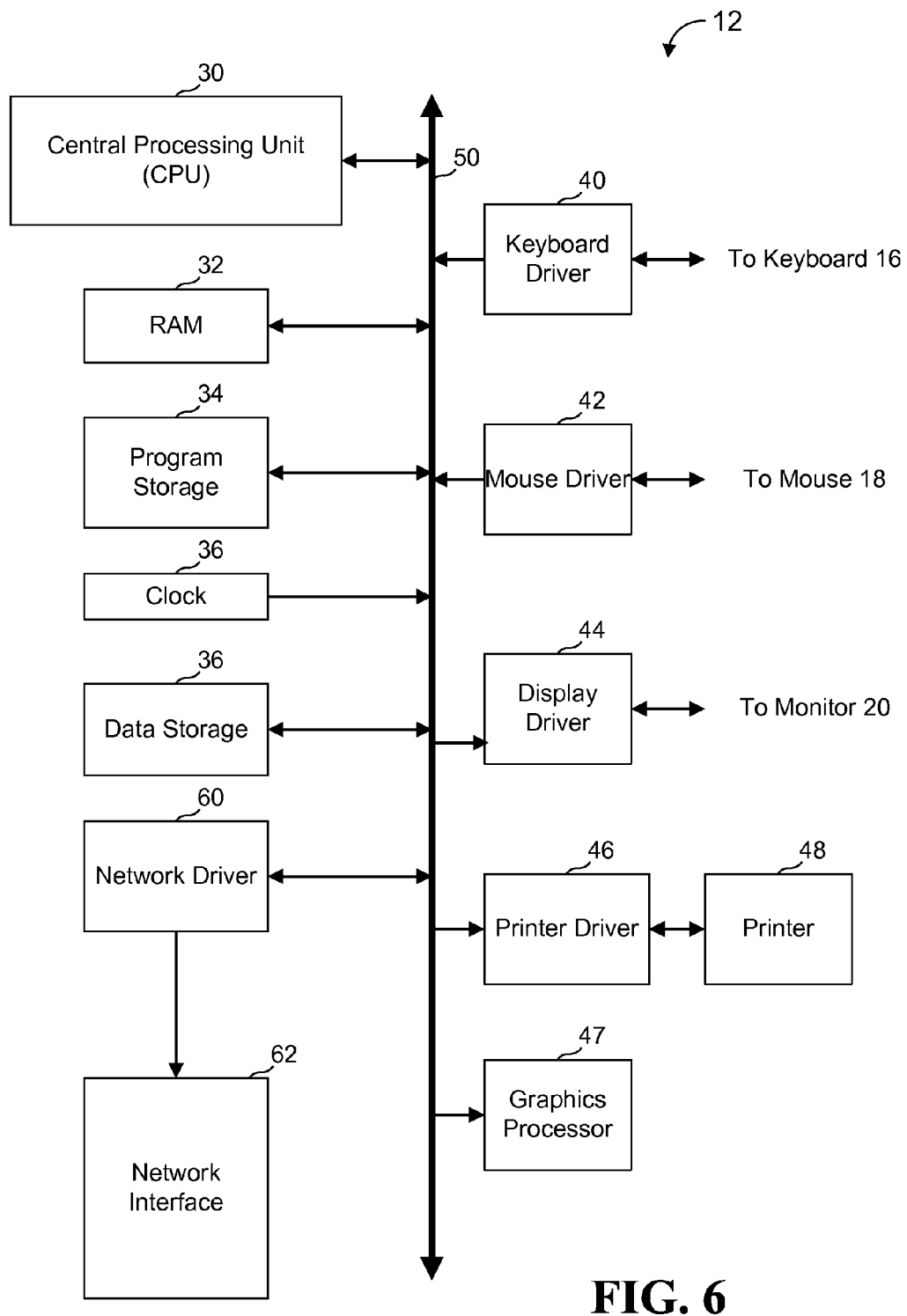
FIG. 6 shows a schematic diagram of a processing unit suitable for use with embodiments of the present invention.

FIG. 6 shows a schematic diagram of the processing unit 12. A central processing unit 30 may communicate with various other components via a main bus 50 and other suitable communication lines (not shown). Data may be stored in volatile memory such as RAM 32, program storage 34 and/or data storage 36. The program storage 34 and/or data storage 36 may include various types of computer-readable media, such as CD-ROMs or other type of optical disks, floppy diskettes, ROMs, RAMs, EPROMs, EEPROMs, magnetic or optical cards and drives, flash memory, or other types of machine-readable mediums suitable for storing electronic instructions. Computer-readable instructions may be stored in the program storage 34. When executed by the computer, these instructions may cause the computer to implement specific methods as described herein, and may cause the computer to operate in accordance with those methods. In an embodiment, execution of the instructions stored in the program storage 34 may transform a general-purpose computer into a computer configured to perform one or more methods embodied by the instructions. A clock 35 may be used to synchronize operation of the other elements of processing unit 12. A network driver 60 may manage connections between a network interface 62, such as a TCP/IP or other suitable interface, to allow the computer to communicate with other computers, operators, or other entities. A keyboard driver 40 may communicate with the keyboard 16 to receive input from an operator. A mouse driver 42 may manage communication with the mouse 18 to coordinate reception of input signals. A display driver 44 may manage communications between the processing unit 12 and the monitor 20, such as to display appropriate output on the monitor 20. Similarly, a printer driver 46 may manage communications with a printer 48. A graphics processor 47 may generate and manage manipulation and display of graphical elements such as 2D images, 3D images and objects, and other visual elements. The general operation of the various components shown in FIG. 5 otherwise will be understood by one of skill in the art.

Figure 7:
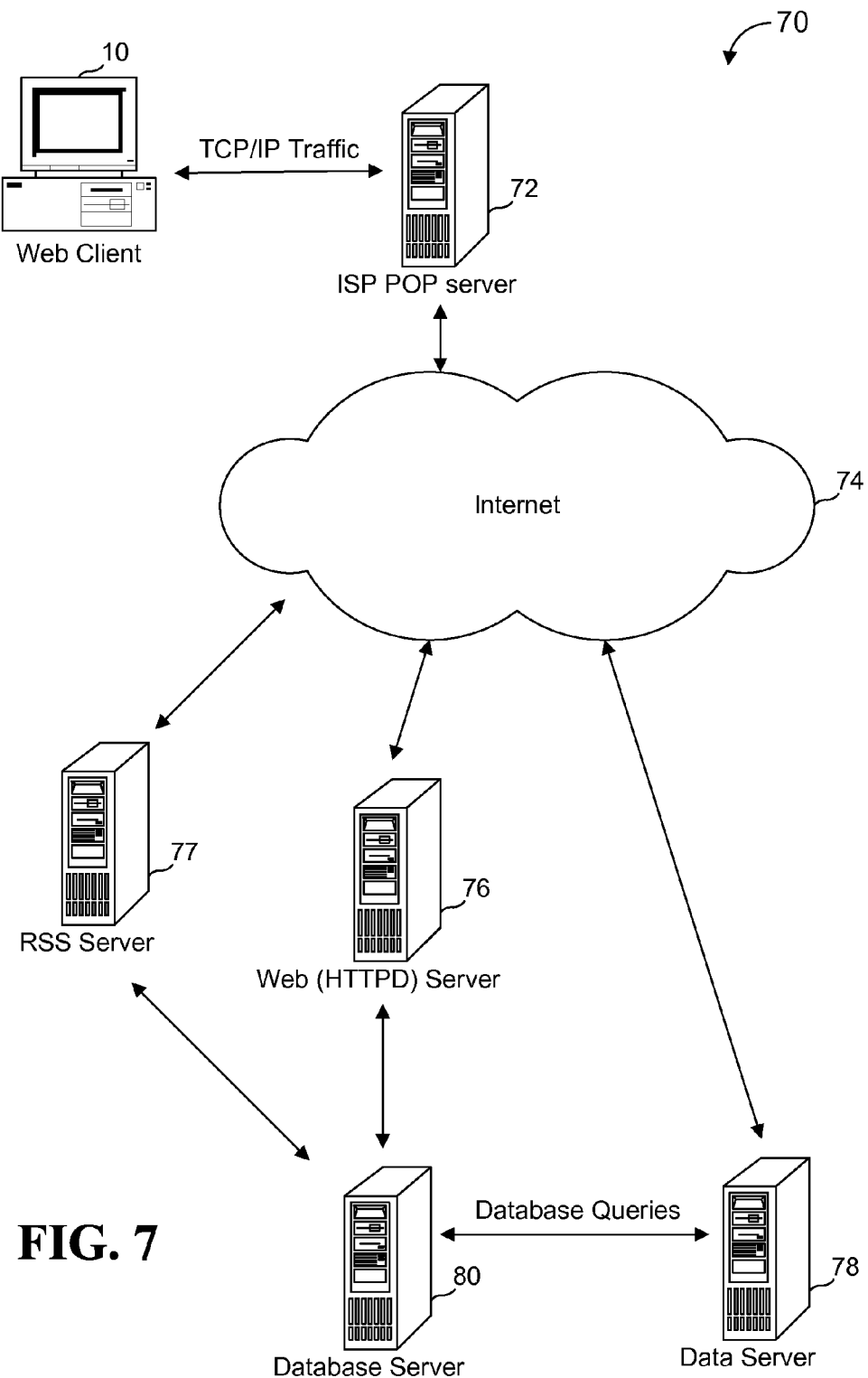
FIG. 7 shows an example of a computer network suitable for use with embodiments of the present invention.

FIG. 7 shows an example of a computer network 70 suitable for use with the present invention. A client such as the computer 10 may access the Internet or other network via a point of presence server 72 or other server, such as provided by an ISP. The computer 10 may access various servers, such as a Web or HTTP server 76, an RSS server 77, or other suitable server or other information provider. As previously described, the various computers 10, 76, 77 may communicate with one or more databases 80 or other data servers 78 to retrieve information. The general operation of the network 70 and the various components shown in FIG. 7 otherwise will be understood by one of skill in the art.

An embodiment of the invention may be embodied in the form of computer-implemented processes and apparatuses for practicing those processes. Embodiments also be embodied in the form of a computer program product having computer program code containing instructions embodied in tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing the invention. Embodiments of the invention also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing the invention. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-implemented method of constructing a parcel shipping Web page, the method comprising:
    presenting a plurality of Web page development components to a developer, each Web page development component consisting of the scripting and presentation elements necessary to implement a distinct functional component of a production parcel shipping Web page;
    receiving a selection of one of the plurality of Web page development components, the selected Web page development component including a distinct functional component configured to provide an initial notification to the production parcel shipping Web page when the distinct functional component causes parcel related data changes, wherein the initial notification indicates to the production parcel shipping Web page that a change of the parcel related data has occurred; and
    responsive to the selection, constructing a production parcel shipping Web page that includes the distinct functional component associated with the selected Web page development component, the production parcel shipping Web page configured to provide a subsequent notification to a second distinct functional component upon receiving the initial notification from the distinct functional component associated with the selected Web page development component, wherein the second distinct functional component subscribes to receive notifications related to changes in the parcel related data.

2. The method of claim 1, wherein the selected Web page component consists of the functionality and presentation elements required to implement at least one of: a user login component, a user account creation component, a carrier/service selection component, an address entry component, a system requirement display component, a package dimension input component, or a carrier/product option selection component, in the production parcel shipping Web page.

3. The method of claim 1, wherein the selected Web page development component is usable in a plurality of production Web pages, each of the plurality of production Web pages including the functional component associated with the Web page development component.

4. A method of constructing a production Web page, the method comprising:
    presenting a plurality of Web page development components to a developer in a development library, each Web page development component containing Web page scripting elements and functional elements necessary to implement a distinct functional component of a production Web page, wherein the distinct functional component does not have any constituent source code related to the functionality or presentation of other distinct functional components of the production Web page;
    receiving a selection of one of the plurality of Web page development components, wherein the selected one of the plurality of Web page development components is configured to provide a notification of a data change within the Web page development component to the production Web page;
    responsive to the selection, constructing an intermediate Web page file that includes the distinct functional component associated with the selected Web page development component; and
    generating from the intermediate Web page file a production Web page, wherein the production Web page is configured to separate functional components and presentation components of the distinct functional component into separate files.

5. The method of claim 4, wherein the selected Web page development component comprises each of one or more scripting elements necessary to implement the distinct functional component.

6. The method of claim 4, wherein the selected Web page development component comprises each of one or more presentation elements necessary to implement the distinct functional component.

7. The method of claim 4, wherein the selected Web page development component consists of one or more scripting and presentation elements necessary to implement the distinct functional component.

8. The method of claim 4, wherein the Web page development component is configured to provide a notification of the data change to any other Web page development components in the production Web page that have subscribed to receive notifications of the type of change provided to the production Web page by the selected component.

9. The method of claim 4, further comprising adding a functional block corresponding to the selected Web page development component to the production Web page.

10. The method of claim 4, wherein the selected Web page development component is usable in constructing a plurality of production Web pages, each of the plurality of production Web pages including the distinct functional component associated with the selected Web page development component.

11. The method of claim 4, further comprising: adding a functional block corresponding to the selected Web page development component to an intermediate Web page file; and generating the production Web page from the intermediate Web page file.

12. The method of claim 11, wherein the step of generating the production Web page further comprises: grouping script components defined in the selected Web page development component and a second Web page development component into a single functional block; and adding the single functional block to the production Web page.

13. The method of claim 11, wherein the step of generating the production Web page further comprises: grouping presentation components defined in the selected Web page development component and a second Web page development component into a single functional block; and adding the single functional block to the production Web page.

14. The method of claim 13, wherein the step of generating the production Web page further comprises:

grouping script components defined in the selected Web page development component and a second Web page development component into a single functional block; and adding the single functional block to the intermediate Web page file.

15. The method of claim 4, wherein the selected Web page component defines all the functionality and presentation required to implement at least one of: a user login component, a user account creation component, a carrier/service selection component, an address entry component, a system requirement display component, a package dimension input component, or a carrier/product option selection component, in the production Web page.

* * * * *